United States Patent [19]

Fujioka et al.

[11] 4,012,559

[45] Mar. 15, 1977

[54] RADIATION CURABLE COATING COMPOSITION AND PRECOATED METAL HAVING TOP COAT BASED ON THE SAME

[75] Inventors: Shuji Fujioka; Junichi Fujikawa; Masao Takahashi, all of Otsu; Tadashi Tanaka, Yokohama; Akira Okamoto, Yokohama; Nagaharu Ueno, Yokohama, all of Japan

[73] Assignees: Toray Industries, Inc; Nippon Steel Corporation, both of Tokyo, Japan

[22] Filed: Oct. 30, 1975

[21] Appl. No.: 627,467

[30] Foreign Application Priority Data

Oct. 31, 1974   Japan ............................ 49-124870

[52] U.S. Cl. ........................... 428/463; 204/159.16; 260/23 R; 260/31.8 R; 260/885; 428/522

[51] Int. Cl.$^2$ .................... C08F 2.54; C08L 31/00; C08L 63/02; B32B 15/08

[58] Field of Search ................ 204/159.11, 159.16; 260/885, 31.8 R, 23 R; 428/461, 463, 516, 520, 522

[56] References Cited

UNITED STATES PATENTS

| | | | |
|---|---|---|---|
| 2,468,094 | 4/1949 | Marks | 260/885 |
| 2,892,716 | 6/1959 | Martin | 260/885 X |
| 3,146,146 | 8/1964 | Aanderson | 428/461 X |
| 3,450,796 | 6/1969 | Griffin | 260/885 |
| 3,585,065 | 6/1971 | Johnson | 204/159.13 X |
| 3,669,825 | 6/1972 | Hall | 428/420 |
| 3,784,501 | 1/1974 | Pettit | 260/885 X |
| 3,912,670 | 10/1975 | Huemmer et al. | 204/159.11 X |
| 3,943,046 | 3/1976 | De Sorfa et al. | 428/461 X |
| 3,957,918 | 5/1976 | Dickey et al. | 428/463 X |
| 3,968,016 | 7/1976 | Wismer | 204/159.16 |
| 3,971,834 | 7/1976 | Uzelmeier et al. | 204/159.16 X |
| 3,979,270 | 9/1976 | Trecker et al. | 204/159.14 |
| 3,984,500 | 10/1976 | Dickey et al. | 428/461 X |

FOREIGN PATENTS OR APPLICATIONS 1,302,515   1/1973   United Kingdom

*Primary Examiner*—Harold Ansher
*Attorney, Agent, or Firm*—Haseltine, Lake & Waters

[57]   ABSTRACT

A radiation curable coating composition suitable for providing a cured coating of enhanced processability on metal substrates, comprising 100 parts of an acrylic copolymer having a number average molecular weight of 15,000 to 800,000 and predominantly comprised of polymerized units of at least one acrylic ester; 5 to 150 parts of at least one polyfunctional compound having a molecular weight of not greater than 2,000 and two or more radical-polymerizable double bonds in the molecule; and 0.2 to 15 parts of at least one non-polymerizable and nonvolatile organic compound having a molecular weight of not greater than 3,000.

6 Claims, No Drawings

RADIATION CURABLE COATING COMPOSITION AND PRECOATED METAL HAVING TOP COAT BASED ON THE SAME

FIELD OF THE INVENTION

The invention relates to a radiation curable coating composition which can provide a cured coating having improved mechanical properties. More particularly, it relates to a radiation curable coating composition especially suitable for forming a cured coating on metal substrates, to provide precoated metal products, which coating has an improved combination of properties desired for such products.

BACKGROUND OF THE INVENTION

Production of precoated metal materials has recently been increasing to a great extent. Such materials are those which have been painted or coated prior to being subjected to shaping processes, and provide a very convenient process for the production of shaped metallic articles when compared with a process in which the material is shaped into an article, e.g. by pressing, and thereafter painted.

Usually, precoated metal materials have heretofore been prepared by applying a thermocurable paint onto a surface-treated metal substrate to form a layer of the paint on the substrate and, then, thermally curing the paint. Other processes wherein a thin film is hot-pressed or adhesively bonded onto a metal sheet to provide an integral laminate, have also been practiced.

Precoated metal materials not only have out-door applications as materials for roofs and side walls, but also have in-door applications as materials for inside walls, cabinets and domestic electrical instruments. Thus, such precoated metal materials are required to have, in addition to corrosion resistance, weatherability and processability for our-door use, as well as processability and resistance to chemicals for in-door use. In addition to these, other properties, including resistance to water, resistance to boiling water, soil resistance, elongation and aesthetic requirements, are also necessary and the required level of each property is considerably high.

United Kingdom patent specification No. 1,302,515 discloses a radiation curable coating composition suitable for use in coating metal substrates, comprising an acrylic copolymer, at least one cross-linking agent whose molecule comprises two or three ethylenic unsaturations and at least one ethylenically unsaturated monomer. When the composition proposed in the U.K. patent is applied to a metal substrate and then suitably irradiated with an electron beam, a hard coating firmly adherent to the substrate, may be formed on the substrate.

In accordance with the present invention it has now been found that if a suitable shock absorber is added to the coating composition disclosed in the U.K. patent, the resultant coating composition can provide, on a metal substrate, a coating which has an improved impact strength and in turn an enhanced processability which is highly desirable for precoated metal materials, without adversely affecting other desirable properties of the coating, such as excellent hardness and high resistance to water and chemicals.

SUMMARY OF THE INVENTION

In accordance with one aspect of the invention, there is provided a radiation curable coating composition which comprises as essential ingredients:

A. 100 parts by weight of an acrylic copolymer having a number average molecular weight of 15,000 to 800,000 and predominantly comprised of polymerized units of at least acrylic ester, selected from acrylic acid esters and alpha-substituted acrylic acid esters;

B. 5 to 150 parts by weight of at least one polyfunctional compound having a molecular weight of not greater than 2,000 and at least two radical-polymerizable double bonds in the molecule, and;

C. 0.2 to 15 parts by weight of at least one non-polymerizable and non-volatile organic compound having a molecular weight of not greater than 3,000.

According to another aspect of the invention there is provided a precoated metal material which comprises a metal substrate and a cured top coating bonded to said substrate directly or via a primer coating, said top coating being based on a radiation curable coating composition comprising as essential ingredients:

A. 100 parts by weight of an acrylic copolymer having a number average molecular weight of 15,000 to 800,000 and predominantly comprised of polymerized units of at least acrylic ester, selected from acrylic acid esters and alpha-substituted acrylic acid esters;

B. 5 to 150 parts by weight of at least one polyfunctional compound having a molecular weight of not greater than 2,000 and at least two radical polymerizable double bonds in the molecule, and;

C. 0.2 to 15 parts by weight of at least one non-polymerizable and non-volatile organic compound having a molecular weight of not greater than 3,000.

DESCRIPTION OF THE INVENTION

Component A

The acrylic copolymers usable as Component A are copolymers of an acrylic ester selected from acrylic acid esters and alpha-substituted acrylic acid esters, having a number average molecular weight of 15,000 to 800,000.

By the term "alpha-substituted acrylic acid" we mean methacrylic acid, alpha-ethyl acrylic acid or alpha-haloacrylic acid. The term "acrylic acid esters and alpha-substituted acrylic acid esters" referred to herein include, $C_{1-12}$ alkyl, $C_1$–$C_{12}$ haloalkyl, $C_1$–$C_{12}$ hydroxyalkyl and glycidyl esters of acrylic and alpha-substituted acrylic acids. Illustrative of such acrylic esters one can mention, for example, are alkyl acrylates, such as methyl acrylate, ethyl acrylate, n-propyl acrylate, iso-propyl acrylate, n-butyl acrylate, iso-butyl acrylate, n-amyl acrylate, n-hexyl acrylate, cyclohexyl acrylate, 2-ethylhexyl acrylate and n-octyl acrylate; halo-alkyl acrylates, such as 2-chloroethyl acrylate and 3-chloropropyl acrylate; hydroxyalkyl acrylates, such as 2-hydroxyethyl acrylate and 2-hydroxypropyl acrylate; alkyl alpha-alkylacrylates, such as methyl methacrylate, ethyl methacrylate, n-propyl methacrylate, iso-propyl methacrylate, n-butyl methacrylate, iso-butyl methacrylate, n-amyl methacrylate, cyclohexyl methacrylate, 2-ethylhexyl methacrylate, n-octyl methacrylate and lauryl methacrylate; alkyl alpha-haloacrylates, such as methyl alpha-chloroacrylate and ethyl alpha-haloacrylate; haloalkyl alpha-alkylacrylates, such as 2-chloroethyl methacrylate and 3-chloropropyl methacrylate; hydroxylakyl alpha-alkylacrylates, such as 2-hydroxyethyl methacrylate, 2-hydroxypropyl methacrylate and 1-chloro-2-hydroxyethyl methacrylate and glycidyl esters such as glycidyl acrylate and glycidyl methacrylate. By the term "predominantly comprised of" we mean that the acrylic copolymer used as Component A should contain at least 50%, preferably at least 60%, by weight of polymerized units of at least one acrylic ester. The balance of the acrylic copolymer may be derived from any suitable comonomers. The acrylic copolymer may be modified, for example, by introducing reactive double bonds to side chains and/or to terminal groups of the main chain. Furthermore, the acrylic copolymer may be a grafted copolymer which may be prepared by polymerizing one or more acrylic esters (and optionally one or more comonomers) in the presence of a minor amount (less than 50% by weight) of a polymeric substrate soluble in the acrylic ester or esters. Examples of such a polymeric substrate include, for example, linear polyesters, polyurethanes, epoxy resins, copolymers of ethylene and vinyl acetate, copolymers of vinyl chloride, chlorinated polyethylenes and chlorinated polypropylenes. When one or more acrylic esters (and optionally one or more comonomers) are polymerized in the presence of a soluble polymeric substrate, the product generally forms a heterogeneous opaque phase exhibiting a sea-and-isles structure which comprises a polymer derived from the acrylic ester or esters (and optionally one or more comonomers) and a grafted copolymer. In any event, the acrylic copolymer usable as Component A should be predominantly comprised of polymerized units of at least one acrylic ester.

The polymerization of the acrylic ester of esters optionally together with suitable comonomers may be carried out by anyone of the known techniques, including solution, suspension and emulsion polymerization processes, until the copolymer so formed has a number average molecular weight of 15,000 to 800,000, as measured by a gel permeation chromatography technique, osmometry or an end group method. With an acrylic copolymer having a number average molecular weight of substantially below 15,000, the adhesion of the coating formed therefrom is poor, whereas if the molecular weight of the acrylic copolymer exceeds the above-specified upper limit, a coating composition containing such a high polymer is often too viscous to provide a coating having a good surface quality.

It has been found that the acrylic copolymer usable as Component A should preferably have a solubility parameter (hereinafter referred to as an SP value) ranging between 9.1 and 10.8. A solubility parameter of a substance is the square root of the cohesive energy density (CDE) of the substance. It is defined by the following equations and can be calculated deducibly from its molecular structure.

$$SP \text{ (cal}^{1/2}/\text{cc}^{1/2}) = \sqrt{CDE} = \frac{d\Sigma G}{M}$$

wherein
CDE = cohesive energy density of the substance
$d$ = density of the substance
M = molecular weight of the substance
$\Sigma G$ = molecular attraction constant for the molecule (total sum of molecular attraction constants for individual atoms and atomic groups in the molecule)

For detailed discussions about solubility parameter reference is made to P. S. Small; Journal of Applied Chemistry, 3, p71 – 80 (1948) and Polymer Handbook (Interscience Publishers, 1966). Typical acrylic polymers and other polymers have the following (calculated) SP values.

| | |
|---|---|
| Polymethyl methacrylate | 9.25 |
| Polyethyl acrylate | 9.70 |
| Polymethacrylic acid | 10.7 |
| Polyethylene | 8.1 |
| Polybutadiene | 8.38 |
| Cellulose diacetate | 11.35 |
| Polyacrylonitrile | 12.75 |

Generally, the greater the polarity the higher the SP value.

We have found that an acrylic copolymer having an SP value of less than 9.1 generally has poor affinity with pigments and a coating formed therefrom exhibits unsatisfactory adhesion. We have also found that an acrylic copolymer having an SP value of greater than 10.8 is too hydrophilic to provide a coating which has satisfactory resistance to water, moisture and boiling water. For these reasons we prefer to copolymerize acrylic esters with one or more suitable comonomers to prepare acrylic copolymers having an SP value of 9.1 to 10.8.

It has also been found that the acrylic copolymer usable as Component A should preferably contain free OH and/or COOH groups in such an amount that the total number of such groups is 0.1 to 20 per 1,000 of the molecular weight of the copolymer. These groups contribute to promote not only compatibility between Components A and B (especially when Component B has free OH groups) but also wetting of pigments with Component A, resulting in a coating of good adhesion. However, an acrylic copolymer containing 20 or more OH and/or COOH groups per 1,000 of the molecular weight of the copolymer is too hydrophilic to provide a coating having satisfactory resistance to water. Examples of suitable monomers for introduction of OH groups thereinto, include, for example, 2-hydroxyethyl acrylate, 2-hydroxyethyl methacrylate, 2-hydroxypropyl acrylate and 2-hydroxypropyl methacrylate, while illustrative of suitable monomers for introducing COOH groups one can mention, for example, acrylic acid, methacrylic acid, maleic acid, fumaric acid and itaconic acid.

Component B

The radiation curable coating composition in accordance with the invention should contain as Component B at least one polyfunctional compound having a molecular weight of not greater than 2,000 and at least two double bonds in the molecule which may undergo radical-polymerization. By the term "radical-polymerizable double bond" we mean an ethylenical unsaturation which can be activated by irradiation with an electron beam of a suitable intensity to provide free radicals, which undergo radical polymerization. For the sake of brevity, compounds having two or more such unsaturations in the molecule are frequently referred to herein as polyfunctional vinyl monomers. Various types of polyfunctional vinyl monomers may be used as Component B in the radiation curable coating composition in accordance with the invention. Illustrative of them are the following.

1. Acrylic and methacrylic acid esters of polyols; for example, ethylene glycol diacrylate, ethylene glycol dimethacrylate, polyethylene glycol diacrylate, polyethylene glycol dimethacrylate, propylene glycol diacrylate, propylene glycol dimethacrylate, polypropylene glycol diacrylate, polypropylene glycol dimethacrylate, tremethylolpropane triacrylate, trimethylolpropane trimethacrylate, pentacrythritol tri- or tetra-acrylate, penta-erythritol tri- or tetra-methacrylate, glycerin diacrylate and glycerin dimethacrylate.

2. Polyfunctional vinyl monomers having one or more groups of the formula

—COO.CH₂.CH(OH).CH₂ OCOC(R) = CH₂ wherein R represents H OR CH₃.

Polyfunctional compounds of this type may be prepared by reacting glycidyl acrylate or methacrylate with 1. a saturated polycarboxylic acid having no polymerizable unsaturation, such as oxalic, succinic, adipic, sebacic, phthalic, isophthalic, terephthalic, 2,5-dimethylterephthalic, hexahydroterephthalic, thioglycolic, thiovalerianic, trimellitic, tetrahydrophthalic or naphthalenedicarboxylic acid or "Nadic anhydride", that is endo-cis-bicyclo[2,1]hepto-5-ene-2,3-dicarboxylic anhydride;

2. an unsaturated polycarboxylic acid having a polymerizable ethylenical unsaturation, such as itaconic, maleic, fumaric or butenetricarboxylic acid, or:

3. an unsaturated monocarboxylic acid having a polymerizable ethylenical unsaturation, such as acrylic, methacrylic or alpha-chloroacrylic acid.

The reaction between glycidyl acrylate or methacrylate and the above-exemplified carboxylic acid may conveniently be carried out at ambient or elevated temperatures of up to 120° C or higher, in the presence of an acid or basic catalyst, preferably in the presence of a basic catalyst, such as an alkali metal, an alkali metal alcoholate or a tertiary amine. It is desirable in some cases, to carry out the reaction in the presence of a polymerization inhibitor in order to avoid undesirable thermal polymerization. Furthermore, the reaction may be carried out in the presence of a suitable solvent. However, when a solvent is used it should be selected in such a manner that it does not adversely affect the final coating composition.

The most preferred polyfunctional compounds of this type are reaction products of glycidyl methacrylate with acrylic or methacrylic acid.

3. Polyfunctional vinyl monomers having one or more groups of the formula

= N.CH₂CH(OH).CH₂.OCOC(R) = CH₂ wherein R represents H or CH₃.

Polyfunctional compounds of this type may be prepared by reacting glycidyl acrylate or methacrylate with a primary mono- or polyamine compound, such as ethylamine, n-butylamine, aniline, cyclohexylamine ethylenediamine, triethylenediamine, diethylenetriamine, m-xylenediamine or m-xylylenediamine; or with a secondary mono- or polyamine compound, such as di-n-butylamine N-methylaniline, N,N'-diethylethylenediamine, N,N'-dimethyl-m-phenylenediamine or piperazine.

The reaction between glycidyl acrylate or methacrylate and the above-exemplified amine compound may conveniently be carried out at ambient or elevated temperatures of up to 120° C or higher in the presence of an acid or basic catalyst, preferably in the presence of a basic catalyst, such as an alkali metal, an alkali metal alcoholate or a tertiary amine. It is desirable in some cases, to carry out the reaction in the presence of a polymerization inhibitor in order to avoid undesirable thermal polymerization. Furthermore, the reaction may be carried out in the presence of a suitable solvent. However, when a solvent is used it should be selected in such a manner that it does not adversely affect the final coating composition.

The most preferred polyfunctional compound of this type is a reaction product of glycidyl methacrylate with xylylenediamine at a molar ratio of about 4:1.

4. Reaction products of an ethylenically unsaturated monohydric alcohol with an ethylenically unsaturated monoepoxy compound or with a saturated or ethylenically unsaturated polyepoxy compound; and reaction products of a saturated or ethylenically unsaturated polyhydric alcohol with an ethylenically unsaturated monoepoxy compound.

The ethylenically unsaturated monohydric alcohol may be 2-hydroxyethyl acrylate, 2-hydroxyethyl methacrylate, 2-hydroxypropyl acrylate, 2-hydroxypropyl methacrylate, polyethylene glycol monoacrylate, polyethlene glycol monomethacrylate or allyl alcohol.

The preferred ethylenically unsaturated monoepoxy compounds are glycidyl acrylate and glycidyl methacrylate.

The polyepoxy compounds include, for example, diglycidyl ethers and polyglycidyl ethers which are relatively low molecular weight di- or polyepoxy compounds substantially free from hydroxyl groups and may be obtained by reacting epihalohydrin or beta-methylepihalohydrin with di- or polyhydric alcohol or phenol in the presence of an alkaline compound, as well as alicyclic di- or polyepoxy compounds. Among others, typical polyepoxy compounds usable for the preparation of polyfunctional compounds of type 4 are reaction products of "Bisphenol A" with epichlorohydrin or methylepichlorohydrin, as represented by "Epikote" products supplied by Shell International Chemicals Corp and "Epichlon" No. 800 and No. 1,000 supplied by Dainippon Ink Industries Co., Ltd.; alicyclic epoxy compounds, for example, "Unox" No. 221 and No. 289 supplied by Union Carbide Corp; reaction products of glycols with epichlorohydrin or methylepichlorohydrin, such as "DER" No. 732 and No. 736 supplied by Dow Chemical Company, FR-4000, 4001 supplied by Asahi Denka K.K. and "Denacol" products supplied by Nagase Sangyo K.K.; and expoxy compounds of glycidyl ester type which may be prepared by reacting phthalic and/or hexahydrophthalic acids with epichlorohydrin or methylepichlorohydrin, as exemplified by "Shoguin" products supplied by Showa Denko K.K. and "Epichlon" No. 200, No. 300 and No. 400 supplied by Dainippon Ink Industries Co., Ltd.

Examples of polyhydric alcohols usable for the production of polyfunctional compounds of type 4 include, for example, ethylene glycol, propylene glycol diethylene glycol, polyethylene glycol, butanediol, neopentyl glycol, glycerin, trimethylolpropane, pentaerythritol and sorbitol.

The reaction between the ethylenically unsaturated monohydric alcohol with the epoxy compound and the reaction between the polyhydric alcohol with the ethylenically unsaturated monoepoxy compound can proceed even in the absence of a catalyst. However, each of these reactions may conveniently be carried out at ambient or elevated temperatures of up to 120° C or higher in the presence of a suitable catalyst, for example, acid catalysts including Friedel-Crafts catalysts such as boron trifluoride, aluminum trichloride, titanium tetrachloride and ferric chloride, and mineral acids such as sulfuric and hydrochloric acids, as well as basic catalysts such as alkali metals, alkali methal alcoholates and tertiary amines. It is desirable in some cases, to carry out the reaction in the presence of a polymerization inhibitor in order to avoid undesirable thermal polymerization. Furthermore, the reaction may be carried out in the presence of a suitable solvent. However, when a solvent is used it should be selected in such a manner that it does not adversely affect the final coating composition. As a result of the reaction, the epoxy ring(s) in the reactant opens, whereby a reaction product having two or more polymerizable ethylenical unraturations as well as OH group(s) and ether linkage(s) is produced.

The most preferred polyfunctional compounds of type 4 are reaction products of glycidyl methacrylate with 2-hydroxyethyl acrylate or methacrylate.

5. Polyvinyl monomers, for example, divinylbenzene.

6. Polyallyl monomers, such as diallyl phthalate and diallyl maleate.

7. Phosphate monomers, such as tris (acryloxyethyl) phosphate.

8. Polyfunctional compounds obtainable by reacting a di- or poly-isocyanate compound with an ethylenically unsaturated alcohol, such as a reaction product of lysine diisocyanate and 2-hydroxyethyl acrylate in a molar ratio of about 1:2, and a reaction product of trimethylolpropane, hexamethylene diisocyanate and 2-hydroxyethyl acrylate in a molar ratio of about 1:3:3.

9. Linear polyesters and polyamide having ethylenical unsaturations at both ends, and 10. Acrylic copolymers having ethylenical unsaturations on their side chains.

The polyfunctional compounds which may be used as Component B in the radiation curable coating compositions in accordance with the invention, should be non-volatile and capable of being cured by irradiation with a beam of accelerated electrons within a short period of time thereby insolubilizing the co-existing acrylic copolymer to form a tough coating.

We have found that 5 to 150 parts by weight of the polyfunctional compound should be present in the coating composition, based on 100 parts by weight of the acrylic copolymer, Component A. With less than 5 parts by weight of the polyfunctional compound, the resultant coating frequently has poor resistance to solvents due to insufficient crosslinks, whereas as the proportion approaches and exceeds the upper limit, flexibility of the resultant coating tends to become poorer.

Component C

The radiation of curable coating composition in accordance with the invention should contain as Component C, at least one non-polymerizable and non-volatile organic compound having a molecular weight of not greater than 3,000. The Component C should preferably have an SP value of 8.3 to 10.9.

Various types of organic compounds may be used as Component C in the coating composition in accordance with the invention, including, for example, aliphatic dicarboxylic acid esters such as dioctyl adipate, dioctyl sebacate, dioctyl azelate and dibutyl sebacate; aliphatic monocarboxylic acid esters such as butyl oleate, hexyl oleate and methoxy-chlorinated oleic acid butyl ester; aromatic dicarboxylic acid esters such as dioctyl phthalate, diisodecyl phthalate, ditridecyl phthalate, dibutyl phthalate, dicyclohexyl isophthalate, butyl lauryl phthalate, dilauryl phthalate, butyl benzyl phthalate, dibutyl naphthalenedicarboxylate and dioctyl 2,2-phenolic dicarboxylate; aromatic tricarboxylic acid esters such as triisooctyl trimellitate and tri-2-ethylhexyl trimellitate; aromatic tetracarboxylic acid esters such as tetrabutyl pyromellitate and tetraoctyl pyromellitate, epoxydized vegetable oils such as epoxydized soy bean oil, epoxydized cotton seed oil, epoxydized tung oil and epoxydized linseed oil, epoxydized fatty acid esters such as butyl epoxyoleate, octyl epoxylinoleate, glycidyl epoxystearate and butyl epoxystearate; epoxycyclohexane derivatives such as oleic acid ester of 3,4-epoxycyclohexylmethanol, isodecyl 3,4-epoxycyclohexylcarboxylate and dibutyl 4,5-epoxycyclohexane-1,2-dicarboxylate; epoxy resins based on the reaction between "Bisphenol A" and epichlorohydrin; phosphates such as tri-2-ethylhexyl phosphate, tricresyl phosphate and tributoxyethyl phosphate; sulfonic acid esters and amides such as o- and p-toluenesulfonamide, N-ethyl-, N-butyl-, N-cyclohexylsulfonamide and 4-(alkylsulfonyl)morpholine; esters of diols such as polyethylene glycol di-2-ethylhexanoate, 1,4-butanediol dinonanoate and propylene glycol dinonanoate; esters of polyols such as glycerine monooleate diacetate, pentaerythritol tetracaprylate and dipentaerythritol hexaadipate- and linear polyesters, for example, derived from glycols such as ethylene glycol, 1,2-propylene glycol, 1,3-butylene glycol, 1,4-butylene glycol, triethylene glycol and neopentylglycol, and dicarboxylic acids such as maleic, adipic, azelaic, phthalic and sebacic acids.

We have found that a Component C having an SP value of 8.3 to 10.9 exhibits good compatibility with the coexisting acrylic copolymer and forms a uniform coating having an excellent surface quality.

By the term "non-volatile" we mean that the loss of weight by being heated in atmospheric air at a temperature of 125° C ±3° Cl for a period of 3 hours, is not greater than 2.0%.

Component C should have a molecular weight of not greater than 3,000. It is believed that such molecules of Component C enter among high molecules of the acrylic copolymer, acting as something like "rollers" to enhance slippage of high molecules, whereby occurrence of cracking in the cured coating upon the abrupt deformation thereof, can be effectively prevented.

Component C should be present in the coating composition in an amount of 0.2 to 15 parts by weight based on 100 parts by weight of the co-existing acrylic copolymer. With less than 0.2 parts by weight of Component C per 100 parts by weight of Component A, advantages in accordance with the invention, that is improved impact strength and flexibility of the cured coating, cannot be obtained. On the other hand, if the amount of Component C is in excess of the upper limit, properties of the coating such as hardness, resistance to solvents and soil resistance, will deteriorate.

Besides the above-mentioned essential ingredients, the coating composition, in accordance with the invention, may contain monofunctional monomers, containing a polymerizable ethylenical unsaturation, and volatile diluents. Such monofunctional monomers may be either volatile or non-volatile. Volatile monomers act as a diluent and include, for example, methyl methacrylate, methyl acrylate, ethyl acrylate, butyl acrylate and vinyl acetate. Non-volatile, polymerizable monomers are polymerized during the coating step and constitute a part of the cured coating. Accordingly, if such non-volatile, polymerizable monomers are used in the coating composition, they should carefully be selected so as not to adversely affect the properties of the cured coating. Examples of non-volatile, polymerizable monomers include, for example, styrene, vinyltoluene as well as acrylic and methacrylic acid esters of higher fatty alcohols such as cyclohexyl methacrylate, 2-ethylhexyl methacrylate, isodecyl methacrylate and lauryl methacrylate.

The non-polymerizable diluents which are used, must be volatile. They must substantially be removed from the coating prior to the irradiation with a beam of accelerated electrons by drying at room or slightly elevated temperatures. If a considerable amount of the non-polymerizable diluent has remained in the cured coating, properties of the coating, such as adhesion to the substrate during processing, or resistance to water and chemicals, are frequently deteriorated. It should be appreciated that a solvent or solvents which have been used in the synthesis of Component A and/or Component B, may remain in the coating composition as a diluent. Examples of such diluents include, for example, ethyl acetate, butyl acetate, methyl cellosolve, ethyl cellosolve, acetone, methyl ethyl ketone, methyl isobutyl ketone, isopropyl alcohol, benzene, toluene and xylene.

The optimum proportion of Component C in the coating composition will be governed by an adequate viscosity for application of the composition. This adequate viscosity of the coating composition may vary depending upon the particular method of application, the nature of the applicator used, the applicating speed, the thickness of the coating to be applied and the surface properties required, and may be adjusted by suitable selecting the particular diluent and the amounts thereof.

The coating compositions in accordance with the present invention, may further contain various additives conventionally used in coating compositions, such as pigments, fillers, surfactants, dispersing agents, UV absorbers and antioxidants. The proportions of such additives may vary within the conventional ranges depending upon the required properties of the final products.

The advantages of the coating composition in accordance with the present invention may be best enjoyed when it is used for coating metal sheets such as various steel sheets (including non-treated steel sheets, steel sheets plated with zinc and steel sheets treated with zinc phosphate) and aluminum sheets, to prepare precoated metal materials. The coated metal sheets are, in view of the excellent processability of the cured coating, capable of being formed into various shaped articles by pressing and/or extrusion. However, it should be appreciated that the coating compositions in accordance with the invention may be used for coating metal materials or articles of other shapes as well as other materials such as wood, plastics, films, glass and ceramics.

The structure of the coating formed on the substrate may be a single layer or two or more different layers. Where high corrosion resistance is required as in the case of colored steel panels, a composite structure of the coating is desirable, the lower layer being formed from a coating composition of the present invention which contains corrosion-resistant pigments, while the upper layer is formed from another coating composition of the invention which contains coloring pigments. In another case wherein excellent processability is required, the lower layer may be a primer firmly adherent to the substrate while the upper layer may be a top coating having excellent processability formed from a coating composition, in accordance with the present invention.

The coating composition, in accordance with the present invention, may be applied to the substrate using any conventional manner such as spraying, curtain-flow coating, roller coating, casting or knife edge coating, to form a uniform thin layer of the coating composition on the substrate. Application under pressure is also possible, and the applied coating may be heated in order to remove or eliminate the volatile diluents prior to irradiation.

To cure the applied coating, it is irradiated with a high energy electron beam. By the term "high energy electron beam" is meant a beam of electrons accelerated with an accelerating energy of 0.1 to 3.0 MeV by means of electron accelerators of various types including the Cockcroft type, Cockcroft-Walton type, Van de Graaf type, resonance transformer type, insulated core transformer (ICT) type, linear type, Dynamitron type, high frequency type and "Electrocurtain" type. While the dose of electrons may vary depending upon the required hardness and other properties of the cured coating, we have found that a dosage of 0.1 to 20 Mrad is generally suitable. With a dosage of less than 0.1 Mrad, the hardness of the cured coating is frequently poor, while use of dosages greater than 20 Mrad tends to deteriorates the cured coating. Since oxygen in the air tends to prohibit or supress desired curing, it is desirable to carry out the irradiation in an atmosphere of inert gas such as nitrogen, carbon dioxide, helium, argon, neon or a combussion gas.

The cured coatings obtainable from the coating compositions in accordance with the invention have a combination of desired levels of properties, with respect to weatherability, corrosion resistance, adhesion to the substrate during processing, and resistance to chemicals, water and boiling water. Among others, distinct improvements can be achieved in adhesion of the cured coating to the substrate during processing. It is believed that this is a combined effect of the three essential components, that is; the acrylic copolymer having a relatively high molecular weight imparts to the coating high mechanical strength and good weatherability peculiar to acrylic resins; networks of the cross-linked polyfunctional compound render the coating highly resistant to solvents and other chemicals; and the presence of the organic low molecular weight compound contributes to enhancing slippage of the existing high molecules whereby occurrence of cracking may effectively be prevented even when the cured coating undergoes abrupt deformation. These functions are desired especially in the field of precoated metal materials in which high levels of adhesion to the substrate during processing and endurance are required.

The invention will be further described by the following examples, in which all parts are by weight unless otherwise specified.

EXAMPLE 1

1. Preparation of an Acrylic Copolymer

In a four-necked flask (2,000 ml), equipped with a stirrer and a reflux condenser, a monomeric solution of the following composition was prepared.

| | |
|---|---|
| Ethyl acrylate | 92g |
| Methyl methacrylate | 24g |
| 2-Hydroxyethyl methacrylate | 3.4g |
| Acrylic acid | 1.8g |
| Ethyl acetate | 81g |
| Azobisisobutyronitrile | 0.1g |

The mixture was stirred under a stream of nitrogen at a temperature of 80° C for 6 hours to provide a polymerized viscous solution. To the resultant viscous solution another monomeric solution of the following composition was added dropwise over a period of 8 hours while stirring at a temperature of 70° C.

| | |
|---|---|
| Ethyl acrylate | 134g |
| Methyl methacrylate | 74g |
| 2-Hydroxyethyl methacrylate | 6.0g |
| Acrylic acid | 3.2g |
| Ethyl acetate | 109g |
| Butyl acetate | 164g |
| Azobisisobutyronitrile | 0.4g |

To the resultant mixture, 256 g of butyl acetate was added dropwise over a period of 4 hours while stirring was continued at the same temperature to keep the viscosity from rising further. Stirring of the mixture was continued at the same temperature for a further period of 6 hours. At the end of that period the mixture was cooled to an ambient temperature and then mixed with a mixture of 50 g of butyl acetate and 0.3 g of hydroquinone to provide an acrylic resin varnish (containing 32% by weight of non-volatiles). The resin had a number average molecular weight of 95,000, as measured by a gel permeation chromatography (GPC) technique, and an SP value of 9.7.

2. Preparation of a Paint

A master batch of a blue paint was prepared on a three roll mill by adding 10 parts of titanium white and 0.5 part of phthalocyanine Blue B to 100 parts of the above-prepared acrylic resin varnish, and diluting the mixture with xylene.

To a portion of the blue paint, 25 parts of trimethylolpropane triacrylate and 2.5 parts of dioctyl adipate (DOA, SP value of 8.6), both parts being based on 100 parts of the resin in the blue paint, were added, and the resultant mixture was thoroughly stirred. The mixture was then diluted with xylene to provide a radiation curable paint having a viscosity suitable for application with a bar coater.

3. Preparation of Coated Metals

To a steel sheet having a thickness of 0.6 mm and electroplated with zinc, a thermally cured epoxy-acrylic primer coating having a thickness of 2 $\mu$m was applied. Using a bar coater, the radiation curable paint, prepared in the manner described in (2) above, was then applied onto the primer coating with a thickness of 25 $\mu$m in dryness and the sheet was placed in an air oven at a temperature of 100° C for 3 minutes in order to remove the thinner therefrom. The top coating was then cured under a stream of nitrogen by irradiating it with an electron beam of 2.5 Mrad by means of an ICT accelerator operated with a voltage of 300 kV and an electric current of 25 mA.

For comparative purposes the procedure described above was repeated, except that the addition of 2.5 parts of the dioctyl adipate was omitted, so as to provide a control product.

4. Estimate of Properties of the Products

The products were tested for various properties. The results are shown in Table 1 below.

Table 1

| | Steel Sheets Coated with | |
|---|---|---|
| | Paint containing DOA in accordance with the invention | Control Paint with no DOA |
| Pencil Hardness | 2H | 2H |
| Glossiness (%) | 70 | 68 |
| Bending (180°) | | |
| t = 0 | O | O - O |
| t = 1 | O | O |
| Du Pont Impact | | |
| (½" × 1kg ×1kg 50cm) | O | O - Δ |
| | No cracks | considerable cracks |
| Ericksen (8.5mm) | O | O |
| Resistivity to Boiling | | |
| Water (2 hours) | No change | No change |
| Weatherability | No problems | No problems |
| Resistivity to Chemicals | ibid. | ibid. |

As seen from the data in Table 1, the steel sheet coated with the paint which contains DOA in accordance with the present invention, had an enhanced processability, especially with respect to Du Pont Impact and Bending.

EXAMPLE 2

To prepare a radiation curable paint in accordance with the present invention, another portion of the blue paint from the master batch prepared in Example 1 was admixed with 20 parts of trisacryloxyethyl phosphate and 10 parts of ethylene glycol dimethacrylate as crosslinking agents, and 3.5 parts of dioctyl sebacate (DOS, SP value of 8.4), all the parts being based on the resin present in the blue paint. A control paint which contained no DOS was similarly prepared. Using each of the paints so prepared, the procedure as described in Example 1, (3), was repeated to prepare a coated steel sheet, except that the steel sheet had a thickness of 0.8 mm and the dose of electron beam was 3 Mrad.

The products were tested for various properties. The results are shown in Table 2 below.

Table 2

|  | Paint containing DOS in accordance with the invention | Control Paint with no DOS |
|---|---|---|
| Pencil Hardness | H | H |
| Glossiness (%) | 73 | 70 |
| Bending (180°) |  |  |
| t = 0 | O | O |
| t = 1 | O | O |
| Du Pont Impact |  |  |
| (½" × 1kg × 50cm) | O | Δ |
| Ericksen (8.5 mm) | O | O |
| Resistivity to Boiling Water |  |  |
| (2 hours) | No change | No change |
| Weatherability | No problems | No problems |
| Resistivity to chemicals | ibid. | ibid. |

As seen from the data in Table 2, the steel sheet coated with the paint which contained DOS in accordance with the present invention, had an enhanced processability, especially with respect to Du Pont Impact and Bending.

EXAMPLE 3

1. Preparation of an Acrylic Copolymer

In a four-necked flask (2,000 ml), equipped with a stirrer and a reflux condenser, a monomeric solution of the following composition was prepared.

| Butyl acrylate | 73g |
|---|---|
| Ethyl acrylate | 40g |
| Methyl methacrylate | 101g |
| Acrylic acid | 3.2g |
| Glycidyl methacrylate | 6.0g |
| Ethyl acetate | 120g |
| Butyl acetate | 153g |
| Azobisisobutyronitrile | 0.25g |

The mixture was stirred under a stream of nitrogen at a temperature between 73° and 75° C over a period of 13 hours, to provide a polymerized viscous solution. At the end of the 13 hours 95% of the monomer in the mixture was polymerized. After the end of the 13 hour period, a mixture of 36 g of butyl acetate and 0.17 g of hydroquinone was thoroughly admixed into the viscous solution, to provide an acrylic resin varnish (containing 40% by weight of non-volatile). The resin had a number average molecular weight of 32,000, as measured by a gel permeation chromatography (GPC) technique, and an SP value of 9.6.

2. Preparation of a Paint

A master batch of a white paint was prepared on a ball mill by adding 15 parts of titanium white to 100 parts of the acrylic resin varnish, prepared in a manner as described in (1) above, and diluting the mixture with xylene. To a portion of the white paint, 20 parts of trimethylolpropane trimethacrylate and 3 parts of diactyl phthalate (DOP, SP value of 8.9), both parts being based on 100 parts of the resin in the white paint, were added, and the resultant mixture was thoroughly stirred and then diluted with xylene to provide a radiation curable paint having a viscosity suitable for application with a bar coater.

3. Preparation of Coated Metals

To a steel sheet, having a thickness of 0.6 mm and electroplated with zinc, an epoxy-acrylic primer coating having a thickness of 2 um was applied, using a bar coater. The radiation curable paint prepared in a manner as described in (2) above, was then applied onto the primer coating with a thickness of 27 um in dryness. The sheet was then placed in an air oven at a temperature of 100° C for 3 minutes to remove the thinner therefrom. The top coating was then cured under a stream of nitrogen by irradiating it with an electron beam of 3 Mrad.

4. Estimate of Properties of the Products

The products were tested for various properties. The results are shown in Table 3 below. As seen from the data in said table, the steel sheet coated with the paint which contained DOP in accordance with the invention had enhanced processability, especially with respect to Du Pont Impact and Bending.

Table 3

|  | Steel Sheets Coated with | |
|---|---|---|
|  | Paint containing DOP in accordance with the invention | Control Paint with no DOP |
| Pencil Hardness | 2H | 2H |
| Glossiness (%) | 75 | 74 |
| Bending (180°) |  |  |
| t = 0 | O | X |
| t = 1 | O | Δ-O |
| Du Pont Impact |  |  |
| (½" × 1kg × 50cm) | O | Δ |
| Ericksen (8.5mm) | O | O |
| Resistivity to Boiling Water |  |  |
| (2 hours) | No change | No change |
| Weatherability | No problems | No problems |
| Resistivity to chemicals | ibid. | ibid. |

EXAMPLE 4

To prepare a radiation curable paint in accordance with the present invention, another portion of the white paint from the master batch prepared in Example 3, was admixed with 15 parts of trimethylolpropane triacrylate, 15 parts of tris (acryloxyethyl) phosphate and 3.5 parts of triphenyl phosphate (TPPA, SP value of 10.5), all the parts being based on the resin present in the white paint.

To an aluminum sheet, having a thickness of 0.6 mm, which had been treated with chromic acid, the radiation curable paint, prepared in the manner described in (2) above, was then applied with a thickness of 20 μm in dryness. The sheet was then placed in an air oven at a temperature of 100° C for 2 minutes to remove the thinner therefrom. The top coating was then cured by irradiating it with an electron beam of 3 Mrad under a stream of nitrogen, and a coloured aluminum sheet was obtained.

The products were tested for various properties. For comparative purposes, the procedure described above was repeated, except that the addition of TPPA was omitted to provide a control product. The results are shown in Table 4 below.

Table 4

|  | Paint containing TPPA in accordance with the invention | Control paint with no TPPA |
|---|---|---|
| Pencil Hardness | 2H | 2H |
| Glossiness (%) | 67 | 66 |
| Bending (180°) |  |  |
| t=1 | O | Δ |
| t=2 | O | O |
| Du Pont Impact |  |  |
| (½" × 500g × 50cm) | O | Δ |
| Ericksen (6mm) | O | O |
| Xylene Rubbing (times) | 500 | 500 |
| Resistivity to chemicals |  |  |
| (Acids & Alkalis) | O | O |

Table 4-continued

|  | Paint containing TPPA in accordance with the invention | Control paint with no TPPA |
|---|---|---|
| Weatherability | No problem | No problem |

As seen from the data in Table 4, the aluminum sheet coated with the paint which contains TPPA in accordance with the invention had enhanced processability.

EXAMPLE 5

1. Preparation of an Acrylic Copolymer

In a four-necked flask (2,000 ml), equipped with a stirrer and a reflux condenser, a monomeric solution of the following composition was prepared.

| Ethyl acrylate | 92g |
|---|---|
| Methyl methacrylate | 24g |
| 2-Hydroxyethyl methacrylate | 3.4g |
| Acrylic acid | 1.8g |
| Ethyl acetate | 81g |
| Azobisisobutyronitrile | 0.4g |

The mixture was stirred at a temperature of 70° C for 8 hours to provide a polymerized viscous solution. To the resultant viscous solution, 256 g of butyl acetate was added dropwise over a period of 4 hours at the same temperature while being stirred to suppress the viscosity from rising further. Stirring of the mixture was continued at the same temperature for a period of further 6 hours. At the end of that period, to the resultant mixture which was cooled to ambient temperature, a mixture of 0.3 g of hydroquinone and 50 g of butyl acetate was added to provide an acrylic copolymer varnish (containing 32% by weight of non-volatiles). The copolymer had a number average molecular weight of 95,000, as measured by a gel permeation chromatography (GPC) technique.

2. Preparation of a Trimethylolpropane Glycidyl Methacrylate Addition Product (Reaction between a saturated polyhydric alcohol and an unsaturated epoxide).

| Glycidyl methacrylate | 355 parts |
|---|---|
| Trimethylol propane | 132 parts |
| Hydroquinone monomethyl ether | 0.3 part |
| Boron tetrafluoride ethyl etherate | 0.5 part |

A mixture of the above composition was placed in a three-necked flask and heated to a temperature of 50° C. As the reaction proceeded, trimethylolpropane was dissolved into the reaction mixture, the viscosity of which was raised. The mixture was stirred at the same temperature for a period of 4 hours. At the end of said period, the trimethylolpropane was thoroughly dissolved. The mixture was then heated to a temperature of 60° C and stirring was continued for further 4 hours to complete the reaction, which was indicated by a substantial disappearence of the characteristic absorption at 840 cm$^{-1}$ in the IR spectrum, attributed to epoxy groups. The resultant reaction mixture, a clear and colorless solution, having a viscosity of about 100 poise, was mainly comprised of the polyfunctional monomer shown by Formula 1 below. (5-A)

Formula 1

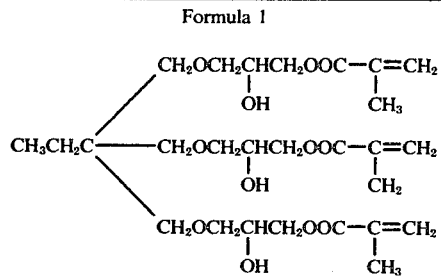

(3) Preparation of Glycerin Monomethacrylate/ Glycidyl Methacrylate Addition Products (Reaction between an unsaturated polyhydric alcohol and an unsaturated epoxide)

| Glycerin | 92 parts |
|---|---|
| Methacrylic acid | 86 parts |
| Concentrated sulfuric acid | 7 parts |
| Hydroquinone monomethyl ether | 0.1 part |
| Benzene | 150 parts |

In a three-necked flask, a mixture of the above composition was refluxed at a temperature of 80° C. As the water formed and the benzene being azeotropically distilled off, the latter was separated from the former in a trap and returned to the flask. The reaction was continued for a period of 2 hours. At the end of the period, the reaction mixture was cooled and then washed twice with demineralized water so as to remove the sulfuric acid as well as any glycerin and methacrylic acid. The reaction mixture so washed was mainly comprised of an unsaturated dihydric alcohol of Formula 2, as identified by a gas chromatography technique.

Formula 2

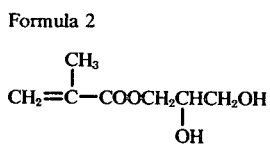

To the resultant solution, 282 parts of glycidyl methacrylate and 0.5 part of boron tetrafluoride ethyl etherate were added at a temperature of 50° in order to react the hydroxyl groups of the unsaturated polyhydric alcohol with the epoxy group of the glycidyl methacrylate. The mixture was subjected to reaction at the same temperature for a period of 8 hours. Completion of the reaction was indicated by a substantial disappearance of the characteristic absorption at 840 cm$^{-1}$ in the IR spectrum, attributed to epoxy groups. The resultant mixture, mainly comprised of a polyfunctional vinyl monomer of Formula 3, was a brown, viscous, solution having a viscosity of about 100 poise.

Formula 3

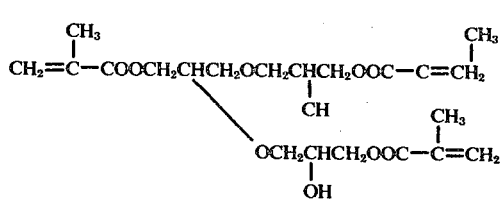

4. Preparation of a Paint

A master batch of a white paint was prepared from the acrylic copolymer varnish obtained by the process described in (1) above and titanium white, in a manner as described in Example 3. To a portion of the white paint, 25 parts of each above polyfunctional vinyl monomer and 2.5 parts of dioctyl adipate, as C component, both parts being based on 100 parts of the resin in the white paint, were added. The resultant mixture was diluted with butyl acetate to provide a viscosity suitable for application.

5. Preparation of Coated Metals and Estimate of the Properties of the Metals

To a steel sheet, having a thickness of 0.6 mm and electroplated with zinc, a thermosetting epoxyacrylic primer coating having a thickness of 2 μm was applied. Using a bar coater, each radiation curable paint, prepared in the manner described in (4) above, was then applied to the primer coating with a thickness of 28–30 μm in dryness and the sheet was placed in an oven at a temperature of 100° C for 3 minutes to remove the thinner therefrom. The top coating was then cured under a stream of nitrogen by irradiating it with an electron beam of 2.5 Mrad by means of an electron-beam accelerator operated with a voltage of 300 kV and an electric current of 25 mA. The resultant products were tested for various properties. The results are shown in Table 5 below.

Table 5

|  | Paint containing 5-A | Paint containing 5-B |
|---|---|---|
| Pencil Hardness | F-H | F |
| Glossiness (%) | 77 | 78 |
| Bending (180°) | | |
| t = 0 20° C | O | O |
| t = 0 0° C | O - O | O - O |
| r = 0 20° C | O | O |
| Du Pont Impact (½" × 1kg × 50cm) | O | O |
| Resistivity to boiling water (2 hour) | No change | No change |
| Resistivity to chemicals | No problems | No problems |

What we claim is:

1. A radiation curable coating composition, which comprises as essential ingredients:
   A. 100 parts by weight of an acrylic copolymer having a number average molecular weight of 15,000 to 800,000 and predominantly comprised of polymerized units of at least one acrylic ester selected from acrylic acid esters and alpha-substituted acrylic acid esters, and having a solubility parameter of from 9.1 to 10.8,
   B. 5 to 150 parts by weight of at least one polyfunctional compound having a molecular weight of not greater than 2,000 and at least two radical-polymerizable double bonds in the molecule, and;
   C. 0.2 to 15 parts by weight of at least one non-polymerizable and non-volatile organic compound having a molecular weight of not greater than 3,000 and having a solubility parameter of from 8.3 to 10.9.

2. A radiation curable coating composition according to claim 1 wherein said acrylic copolymer contains free OH and/or COOH groups in an amount such that the total number of such groups is 0.1 to 20 per 1,000 of the molecular weight of the copolymer.

3. A radiation curable coating composition according to claim 1 wherein said polyfunctional compound is at least one compound selected from the group consisting of trimethylolpropane triacrylate, trimethylolpropane trimethacrylate, pentaerythritol triacrylate, pentaerythritol tetraacrylate, pentaerythritol trimethacrylate, pentaerythritol tetrametacrylate, glycerin diacrylate, glycerin dimethacrylate, a reaction product of glycidyl methacrylate with acrylic acid, a reaction product of glycidyl methacrylate with methacrylic acid, a reaction product of glycidyl methacrylate with xylylenediamine, a reaction product of glycidyl methacrylate with 2-hydroxyethyl acrylate, a reaction of between glycidyl with 2-hydroxyethyl methacrylate, and tris-(acryloxyethyl) phsophate.

4. A radiation curable coating composition according to claim 1 wherein said non-polymerizable and non-volatile organic compound is selected from the group consisting of aliphatic dicarboxylic acid esters, aliphatic monocarboxylic acid esters, aromatic dicarboxylic acid esters, aromatic tricarboxylic acid esters, aromatic tetracarboxylic acids esters, epoxidized vegetable oils, epoxidized fatty acid esters, epoxycyclohexane derivatives, epoxy resins, phosphoric acid esters, sulfonic acid esters and amides, esters of diols, esters of polyols and linear polyesters.

5. A radiation curable coating composition according to claim 1 wherein said non-polymerizable and non-volatile organic compound is selected from the group consisting of dioctyl adipate, dioctyl sebacate and dioctyl phthalate.

6. A precoated metal material which comprises a metal substrate and a cured top coating bonded to said substrate directly or via a primer coating, said top coating being based on a radiation curable coating composition comprising as essential ingredients:
   A. 100 parts by weight of an acrylic copolymer having a number average molecular weight of 15,000 to 800,000 and predominantly comprised of polymerized units of at least one acrylic ester selected from acrylic acid esters and alpha-substituted acrylic acid esters, having a solubility parameter of from 9.1 to 10.8;
   B. 5 to 150 parts by weight of at least one polyfunctional compound having a molecular weight of not greater than 2,000 and at least two radical-polymerizable double bonds in the molecule, and
   C. 0.2 to 15 parts by weight of at least one non-polymerizable and non-volatile organic compound having a molecular weight of not greater than 3,000 having a solubility parameter of from 8.3 to 10.9.

* * * * *